United States Patent [19]

Jen et al.

[11] Patent Number: 5,031,096
[45] Date of Patent: Jul. 9, 1991

[54] METHOD AND APPARATUS FOR COMPRESSING THE EXECUTION TIME OF AN INSTRUCTION STREAM EXECUTING IN A PIPELINED PROCESSOR

[75] Inventors: Amy K. Jen, Vestal; Agnes Y. Ngai, Endwell, both of N.Y.

[73] Assignee: International Business Machines Corporation, Armonk, N.Y.

[21] Appl. No.: 213,565

[22] Filed: Jun. 30, 1988

[51] Int. Cl.⁵ ............................ G06F 9/38; G06F 9/30
[52] U.S. Cl. .................................. 364/200; 364/231.8; 364/264; 364/264.6; 364/259.4; 364/259.9
[58] Field of Search ... 364/200 MS File, 900 MS File

[56]  References Cited
U.S. PATENT DOCUMENTS

| | | | |
|---|---|---|---|
| 4,025,771 | 5/1977 | Lynch, Jr. et al. | 364/200 |
| 4,112,489 | 9/1978 | Wood | 364/200 |
| 4,251,859 | 2/1981 | Momose et al. | 364/200 |
| 4,354,231 | 10/1982 | Carlsson et al. | 364/200 |
| 4,454,578 | 6/1984 | Matsumoto et al. | 364/200 |
| 4,532,589 | 7/1985 | Shintani et al. | 364/200 |
| 4,608,633 | 8/1986 | Boothroyd et al. | 364/200 |

OTHER PUBLICATIONS

IBM Tech Discl. Bulletin; vol. 27, No. 2, Jul. 1984 "Prioritized Instruction Executions" by L. Lin p. 1087.
IBM Tech. Discl. Bull. vol. 15, No. 5; Oct. 1972 "Queue System For 4 Two-Program; Pipelined Instruction Unit"; Fennell, Jr.; pp. 1523-1525.
IBM Journal, Jan. 1967 "An Efficient Algorithm for Exploiting Multiple Arithmetic Units"; R. M. Tomasulo.

*Primary Examiner*—Eddie P. Chan
*Attorney, Agent, or Firm*—Pollock, Vande Sande & Priddy

[57]  ABSTRACT

Apparatus and method which provides a variable instruction stack. Instructions to be executed are fed into a single input multiple output stack register feeding from the lowest to the highest level. Instructions are provided with a valid bit to distinguish instructions requiring execution from those requiring no execution (NOOP). When an instruction not requiring execution (NOOP) propagates to the highest level, the execution unit receives an instruction in a lower level of the stack avoiding any idle time of the execution unit waiting for an executable instruction to propagate to the highest level.

18 Claims, 5 Drawing Sheets

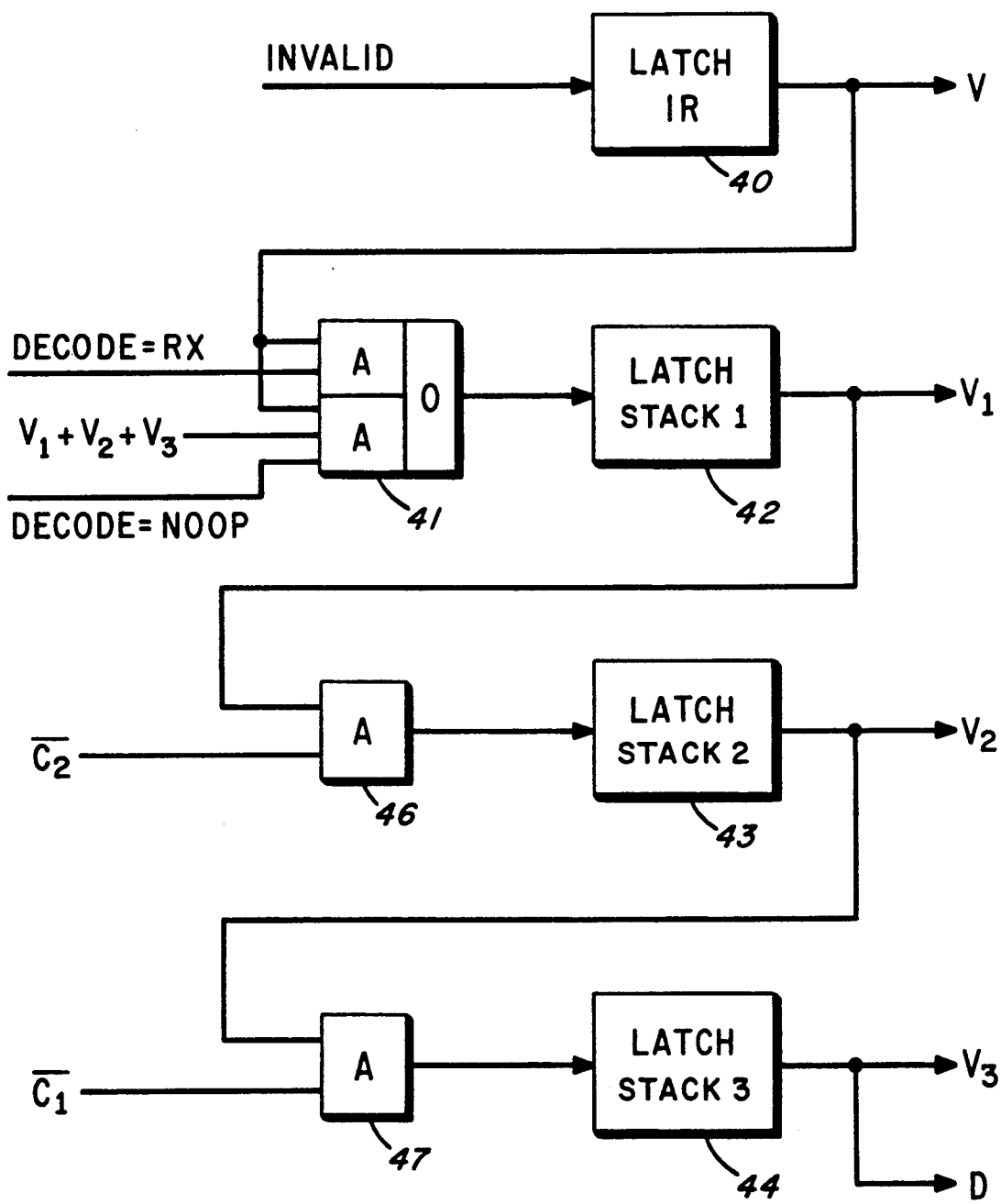

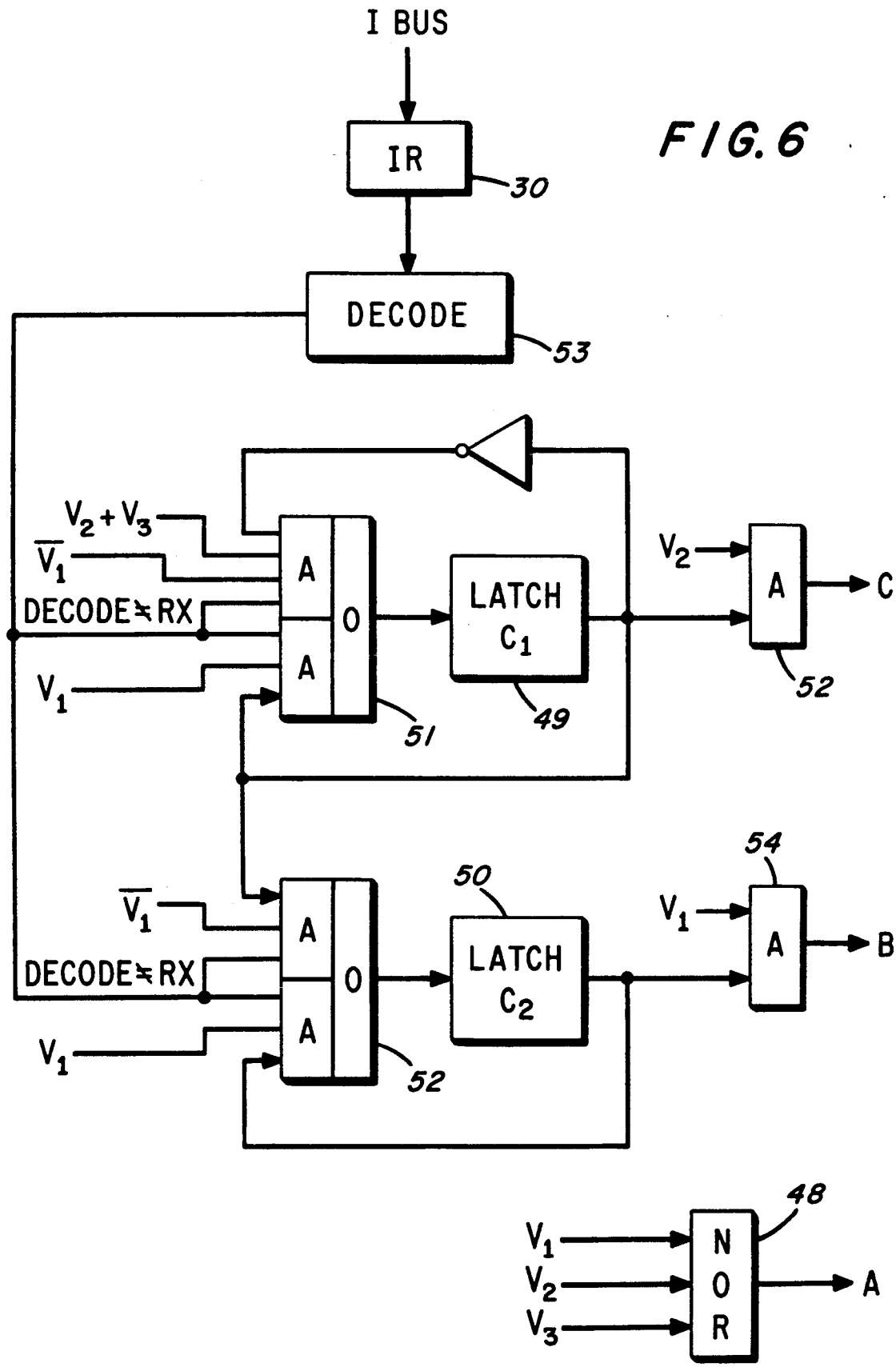

METHOD AND APPARATUS FOR COMPRESSING THE EXECUTION TIME OF AN INSTRUCTION STREAM EXECUTING IN A PIPELINED PROCESSOR

TECHNICAL FIELD

The subject matter of this invention pertains to computing systems, and more particularly, to an apparatus in an instruction processing unit of a multiprocessor and uniprocessor data processing system for reducing the execution time of a set of instructions executing in the instruction processing unit.

In the design and development of computer systems, increasing emphasis is being placed on performance of such systems. The performance is very often a function of the number of instructions executing within the instruction processing unit (IPU) of the computer system per unit of time. Therefore, to improve performance, it is necessary to reduce, decrease, or compress the execution time of a set of instructions executing within the IPU. Furthermore, as the demand for computer power increases and the development cycle for computer design decreases, computer system designers continue to search for alternative designs and to weigh the associated trade-offs of one design over another. A desirable design is one with less relative complexity than previous designs, is completed within a short development schedule, and has increased performance relative to previous designs. The prior art concept of "pipelining" in a processor has increased computer performance. Computer designers are now developing other inventive techniques to further improve the performance of computer systems.

A pipelined processor is designed to allow processing to flow continuously and to minimize the processing time for each instruction. This is achievable if there is no interruption in the execution of the normal pipelined sequence of instructions. Storage data dependency is one of the two major interruptions to the pipeline approach. Time is required to request the data from the storage subsystem, to access the storage medium, and to return the data to the processor before processing can continue. The other interruption is caused by branches, which is not the topic of this application. If all of the data dependencies are not resolved, an instruction cannot be executed. A subsequent instruction cannot proceed even if all the data operands for this instruction are available. One alternative for resolving this data dependency problem, termed out-of-order execution, saves an instruction, having unresolved data dependencies, and executes it later after the data dependency problem is resolved. A tag is assigned to the saved instruction in its associated registers for future execution. Another alternative for resolving this data dependency problem, termed the data-availability interlock design, involves waiting for the return of required storage data before continuing execution. However, this waiting time, called the "data resolution time" is an overhead time that must be paid for, in terms of performance, when first "filling" the pipeline.

SUMMARY OF THE INVENTION

It is an object of the present invention to introduce an improved instruction processing unit (IPU) for a multiprocessor and uniprocessor data processing system.

It is a further object of the present invention to introduce an improved IPU capable of compressing the total execution time of a set of instructions executing within the IPU.

It is a further object of the present invention to introduce an improved IPU, capable of compressing the total execution time of a set of instructions, by subtracting certain increments of time from the "data resolution time" normally associated with the data availability interlock design thereby minimizing the data resolution time and compressing the total execution time of a set of instructions executing within the IPU.

In accordance with these and other objects of the present invention, an improved IPU for a multiprocessor or uni-processor computer system compresses the total execution time of a set of instructions executing therein by subtracting certain increments of time from the "data resolution time". During certain periods, the execution unit of the IPU is not being used, since the IPU is currently executing a NOOP instruction. The subtraction of the increments of time from the "data resolution time" is accomplished by utilizing the execution unit of the IPU to execute another instruction during the periods when the execution unit is not being used (since the IPU is executing a NOOP instruction). A NOOP instruction is one which does not use the execution unit of the IPU during its execution by the IPU. In a typical instruction stream, a number of such NOOP instructions exist. Therefore, the execution unit of the IPU is not being used when the IPU is executing each of the NOOP instructions. Each NOOP instruction is normally followed in the instruction sequence by another non-NOOP instruction which does utilize the execution unit during its execution. Therefore, one technique to compress or reduce the total execution time of the set of instructions executing in the computer system is to utilize the execution unit of the IPU, during the execution of the NOOP instruction, to execute the subsequent non-NOOP instruction in the instruction sequence. If this technique is used each time a NOOP instruction is executed by the IPU, the total execution time of the set of instructions executing in an IPU will be reduced, decreased relative to the total execution time of the set of instructions executing in a prior art IPU.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 5 illustrates apparatus for forming the valid bits used in the instruction stack in the EPU 20-4 of FIG. 3; and FIG. 6 illustrates control circuits in the execution processing unit (EPU) 20-4 of FIG. 4.

DETAILED DESCRIPTION OF THE PREFERRED EMBODIMENT

Figure 1:
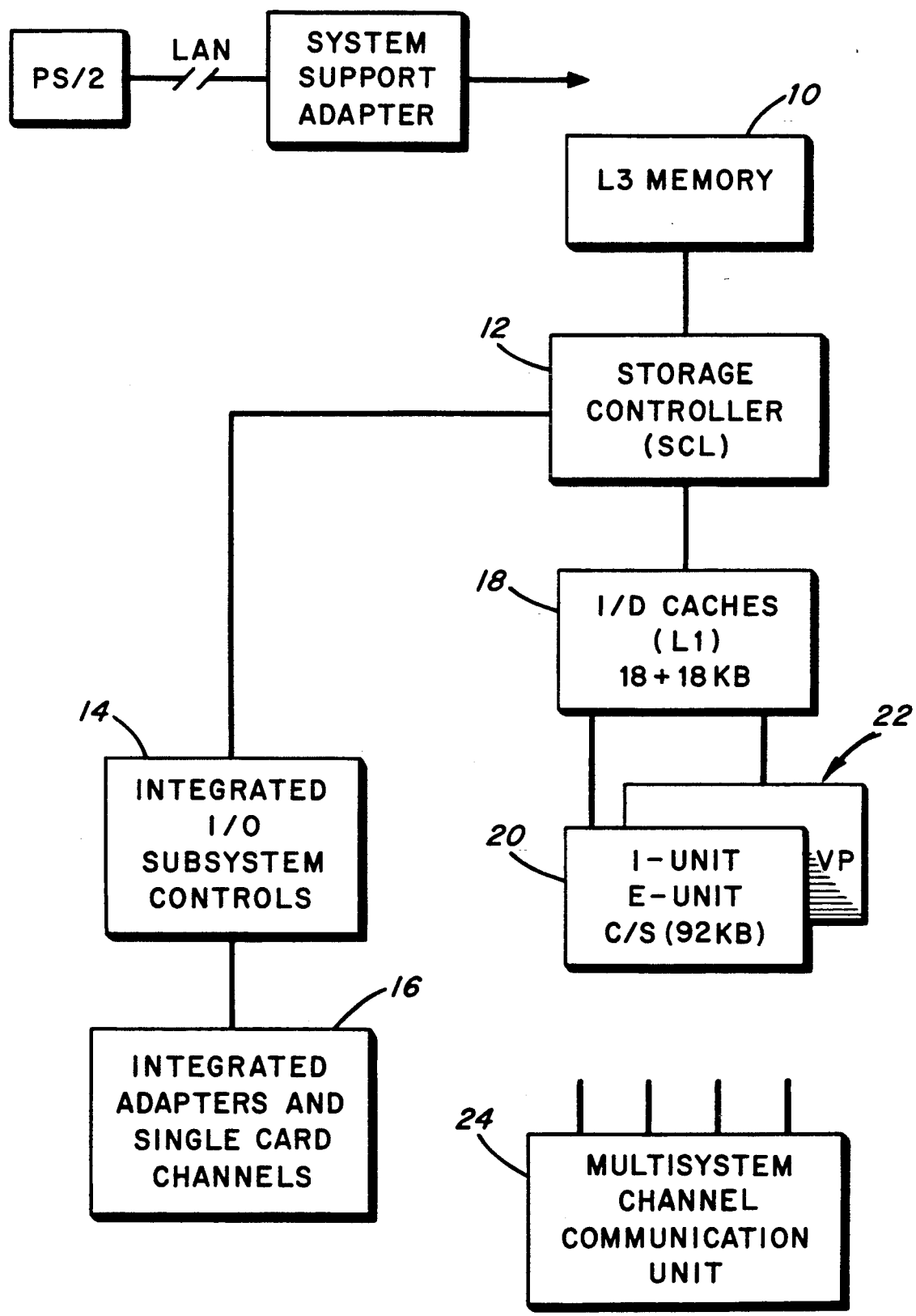
FIG. 1 illustrates a uniprocessor computer system.

Referring to FIG. 1, a uniprocessor computer system of the present invention is illustrated.

In FIG. 1, the uniprocessor system comprises an L3 memory 10 connected to a storage controller (SCL) 12. On one end, the storage controller 12 is connected to an integrated I/O subsystem controls 14, the controls 14 being connected to integrated adapters and single card channels 16. On the other end, the storage controller 12 is connected to I/D caches (L1) 18, which comprise an instruction cache, and a data cache, collectively termed the "L1" cache. The I/D caches 18 are connected to an instruction unit (I-unit), Execution unit (E-unit), control store 20 and to a vector processor (VP) 22. The vector processor 22 is described in pending patent application Ser. No. 530,842, filed Sept. 9, 1983, entitled "High Performance Parallel Vector Processor", the disclosure of which is incorporated by reference into the specification of this application. The uniprocessor system of FIG. 1 also comprises the multisystem channel communication unit 24.

The L3 memory 10 comprises 2 "intelligent" memory cards. The cards are "intelligent" due to the existence of certain specific features: error checking and correction, extended error checking and correction (ECC) refresh address registers and counters, and bit spare capability. The interface to the L3 memory 10 is 8-bytes wide. The L3 memory is connected to a storage controller (SCL) 12.

The storage controller 12 comprises three bus arbiters arbitrating for access to the L3 memory 10, to the I/O subsystem controls 14, and to the I/D caches 18. The storage controller further includes a directory which is responsible for searching the instruction and data caches 18, otherwise termed the L1 cache, for data. If the data is located in the L1 caches 18, but the data is obsolete, the storage controller 12 invalidates the obsolete data in the L1 caches 18 thereby allowing the I/O subsystem controls 14 to update the data in the L3 memory 10. Thereafter, instruction and execution units 20 must obtain the updated data from the L3 memory 10. The storage controller 12 further includes a plurality of buffers for buffering data being input to L3 memory 10 from the I/O subsystem controls 14 and for buffering data being input to L3 memory 10 from instruction/execution units 20. The buffer associated with the instruction/execution units 20 is a 256 byte line buffer which allows the building of entries 8 bytes at a time for certain types of instructions, such as sequential operations. This line buffer, when full, will cause a block transfer of data to L3 memory to occur. Therefore, memory operations are reduced from a number of individual store operations to a much smaller number of line transfers.

The instruction cache/data cache 18 are each 16K byte caches. The interface to the storage controller 12 is 8 bytes wide; thus, an in-page operation from the storage controller 12 takes 8 data transfer cycles. The data cache 18 is a "store through" cache, which means that data from the instruction/execution units 20 are stored in L3 memory and, if the corresponding obsolete data is not present in the L1 caches 18, the data is not brought into and stored in the L1 caches. To assist this operation, a "store buffer" is present with the L1 data cache 18 which is capable of buffering up to 8 store operations.

The vector processor 22 is connected to the data cache 18. It shares the data flow of the instruction/execution unit 20 into the storage controller 12, but the vector processor 22 will not, while it is operating, permit the instruction/execution unit 20 to make accesses into the storage controller 12 for the fetching of data. The integrated I/O subsystem 14 is connected to the storage controller 12 via an 8-byte bus. The subsystem 14 comprises three 64-byte buffers used to synchronize data coming from the integrated I/O subsystem 14 with the storage controller 12. That is, the instruction/execution unit 20 and the I/O subsystem 14 operate on different clocks, the synchronization of the two clocks being achieved by the three 64-byte buffer structure.

The multisystem channel communication unit 24 is a 4-port channel to channel adapter, packaged externally to the system.

Figure 2:
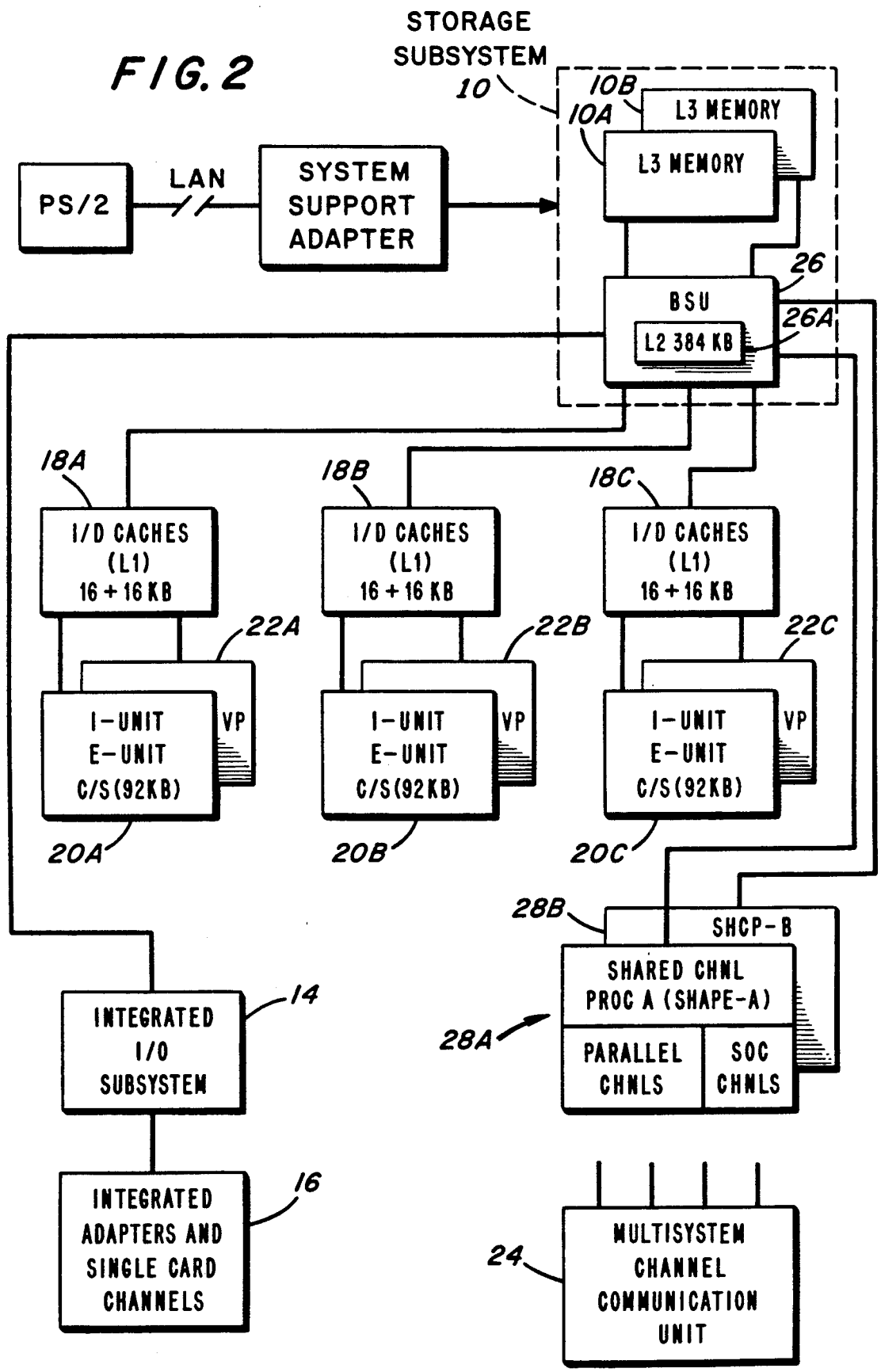
FIG. 2 illustrates a triadic computer system.

Referring to FIG. 2, a triadic (multiprocessor) system is illustrated.

In FIG. 2, a pair of L3 memories 10a/10b are connected to a bus switching unit (BSU) 26, the BSU including an L2 cache 26a. The BSU 26 is connected to the integrated I/O subsystem 14, to shared channel processors 28, and to three processors: a first processor including instruction/data caches 18a and instruction-/execution units/control store 20a, a second processor including instruction/data caches 18b and instruction-/execution units/control store 20b, and a third processor including instruction/data caches 18c and instruction/execution units/control store 20c. Each of the instruction/data caches 18a, 18b, 18c are termed "L1" caches. The cache in the BSU 26 is termed the L2 cache 26a, and the main memory 10a/10b is termed the L3 memory.

The BSU 26 connects the three processors 18a/20a, 18b/20b, and 18c/20c, two L3 memory ports 10a/10b, two shared channel processors 28, and an integrated I/O subsystem 14. The BSU 26 comprise circuits which decide the priority for requests to be handled, such as requests from each of the three processors to L3 memory, or requests from the I/O subsystem 14 or shared channel processors, circuits which operate the interfaces, and circuits to access the L2 cache 26a. The L2 cache 26a is a "store in" cache, meaning that operations which access the L3 memory, to modify data, must also modify data resident in the L2 cache (the only exception to this rule is that, if the operation originates from the I/O subsystem 14, and if the data is resident only in L3 memory 10a/10b and not in L2 cache 26a, the data is modified only in L3 memory, not in L2 cache). The interface between the BSU 26 and L3 memories 10a/10b comprises two 16-byte lines/ports in lieu of the single 8-byte port in FIG. 1. However, the memory 10 of FIG. 1 is identical to the memory cards 10a/10b of FIG. 2. The two memory cards 10a/10b of FIG. 2 are accessed in parallel.

The shared channel processor 28 is connected to the BSU 26 via two ports, each port being an 8-byte interface. The shared channel processor 28 is operated at a frequency which is independent of the BSU 26, the clocks within the BSU being synchronized with the clocks in the shared channel processor 28 in a manner which is similar to the clock synchronization between the storage controller 12 and the integrated I/O subsystem 14 of FIG. 1.

A functional description of the operation of the uniprocessor computer system of FIG. 1 will be set forth in the following paragraphs with reference to FIG. 1.

Normally, instructions are resident in the instruction cache (L1 cache) 18, waiting to be executed. The instruction/execution unit 20 searches a directory disposed within the L1 cache 18 to determine if the typical instruction is stored therein. If the instruction is not stored in the L1 cache 18, the instruction/execution unit 20 will generate a storage request to the storage controller 12. The address of the instruction, or the cache line containing the instruction will be provided to the storage controller 12. The storage controller 12 will arbitrate for access to the bus connected to the L3 memory 10. Eventually, the request from the instruction/execution unit 20 will be passed to the L3 memory 10, the request comprising a command indicating a line in L3 memory is to be fetched for transfer to the instruction/execution unit 20. The L3 memory will latch the request, decode it, select the location in the memory card wherein the instruction is stored, and, after a few cycles of delay, the instruction will be delivered to the storage controller 12 from the L3 memory in 8-byte increments. The instruction is then transmitted from the storage controller 12 to the instruction cache (L1 cache) 18, wherein it is temporarily stored. The instruction is retransmitted from the instruction cache 18 to the instruction buffer within the instruction/execution unit 20. The instruction is decoded via a decoder within the instruction unit 20. Quite often, an operand is needed in order to execute the instruction, the operand being resident in memory 10. The instruction/execution unit 20 searches the directory in the data cache 18; if the operand is not found in the directory of the data cache 18, another storage access is issued by the instruction/execution unit 20 to access the L3 memory 10, exactly in the manner described above with respect to the instruction cache miss. The operand is stored in the data cache, and the instruction/execution unit 20 searches the data cache 18 for the operand. If the instruction requires the use of microcode, the instruction/execution unit 20 makes use of the microcode resident on the instruction execution unit 20 card. If an input/output (I/O) operation need be performed, the instruction/execution unit 20 decodes an I/O instruction, resident in the instruction cache 18. Information is stored in an auxiliary portion of L3 memory 10, which is sectioned off from instruction execution. At that point, the instruction/execution unit 20 informs the integrated I/O subsystem 14 that such information is stored in L3 memory, the subsystem 14 processors accessing the L3 memory 10 to fetch the information.

A functional description of the operation of the multiprocessor computer system of FIG. 2 will be set forth in the following paragraphs with reference to FIG. 2.

In FIG. 2, assume that a particular instruction/execution unit, one of 20a, 20b, or 20c, requires an instruction and searches its own L1 cache, one of 18a, 18b, or 18c for the desired instruction. Assume further that the desired instruction is not resident in the L1 cache. The particular instruction execution unit will then request access to the BSU 26 in order to search the L2 cache disposed therein. The BSU 26 contains an arbiter which receives requests from each of the instruction/execution units 20a, 20b, 20c and from the shared channel processor 28 and from the integrated I/O subsystem 14, the arbiter granting access to one of these units at a time. When the particular instruction/execution unit (one of 20a-20c) is granted access to the BSU to search the L2 cache 26a, the particular instruction/execution unit searches the directory of the L2 cache 26a disposed within the BSU 26 for the desired instruction. Assume that the desired instruction is found in the L2 cache. In that case, the desired instruction is returned to the particular instruction/execution unit. If the desired instruction is not located within the L2 cache, as indicated by its directory, a request is made to the L3 memory, one of 10a or 10b, for the desired instruction. If the desired instruction is located in the L3 memory, it is immediately transmitted to the BSU 26, 16 bytes at a time, and is bypassed to the particular instruction/execution unit (one of 20a-20c) while simultaneously being stored in the L2 cache 26a in the BSU 26. Additional functions resident within the BSU relate to rules for storage consistency in a multiprocessor system. For example, when a particular instruction/execution unit 20c (otherwise termed "processor" 20c) modifies data, that data must be made visible to all other instruction/execution units, or "processors", 20a, 20b in the complex. If processor 20c modifies data presently stored in its L1 cache 18c, a search for that particular data is made in the L2 cache directory 26a of the BSU 26. If found, the particular data is modified to reflect the modification in the L1 cache 18c. Furthermore, the other processors 20a and 20b are permitted to see the modified, correct data now resident in the L2 cache 26a in order to permit such other processors to modify their corresponding data resident in their L1 caches 18a and 18b. The subject processor 20c cannot re-access the particular data until the other processors 20a and 20b have had a chance to modify their corresponding data accordingly.

Figure 3:
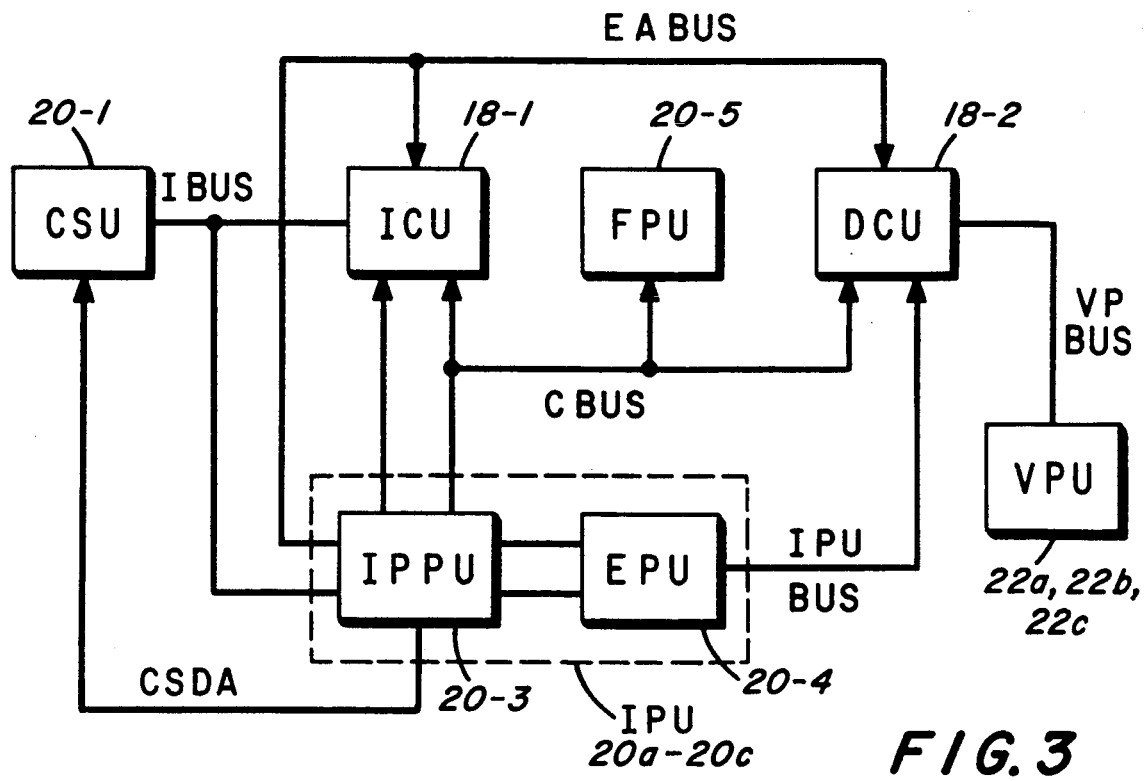
FIG. 3 illustrates a more simplified construction of the L1 caches 18a-18c, the I-unit/E-unit/Control Store 20a-20c, and the Vector Processor 22a-22c of FIGS. 2 and 3.

Referring to FIG. 3, a more simplified construction of the L1 caches 18a-18c, I-unit/E-unit/Control Store 20a-20c, and the vector processor 22a-22c is illustrated. In FIG. 3, the L1 caches each comprise an Instruction Cache Unit (ICU) 18-1 and a Data Cache Unit (DCU) 18-2. The instruction processing unit (IPU) of the present invention (referred to as the I-unit/E-unit/Control Store 20a-20c of FIGS. 1-3) includes the floating point unit (FPU) 20-5, the control store unit (CSU) 20-1, the instruction pre-processing unit (IPPU) 20-3, and the execution processing unit (EPU) 20-4. The DCU 18-2 is connected to the Vector Processing Unit (VPU) 22a-22c via the VP DBUS. The fixed point execution unit 20-4 of FIG. 3 is represented by the Execution Processing Unit (EPU) 20-4. The L1 caches 18-1 and 18-2 (the ICU and DCU) are connected to the floating point unit (FPU) 20-5. The control store subsystem 20-1 of FIG. 3 is the control store unit (CSU).

Figure 4:
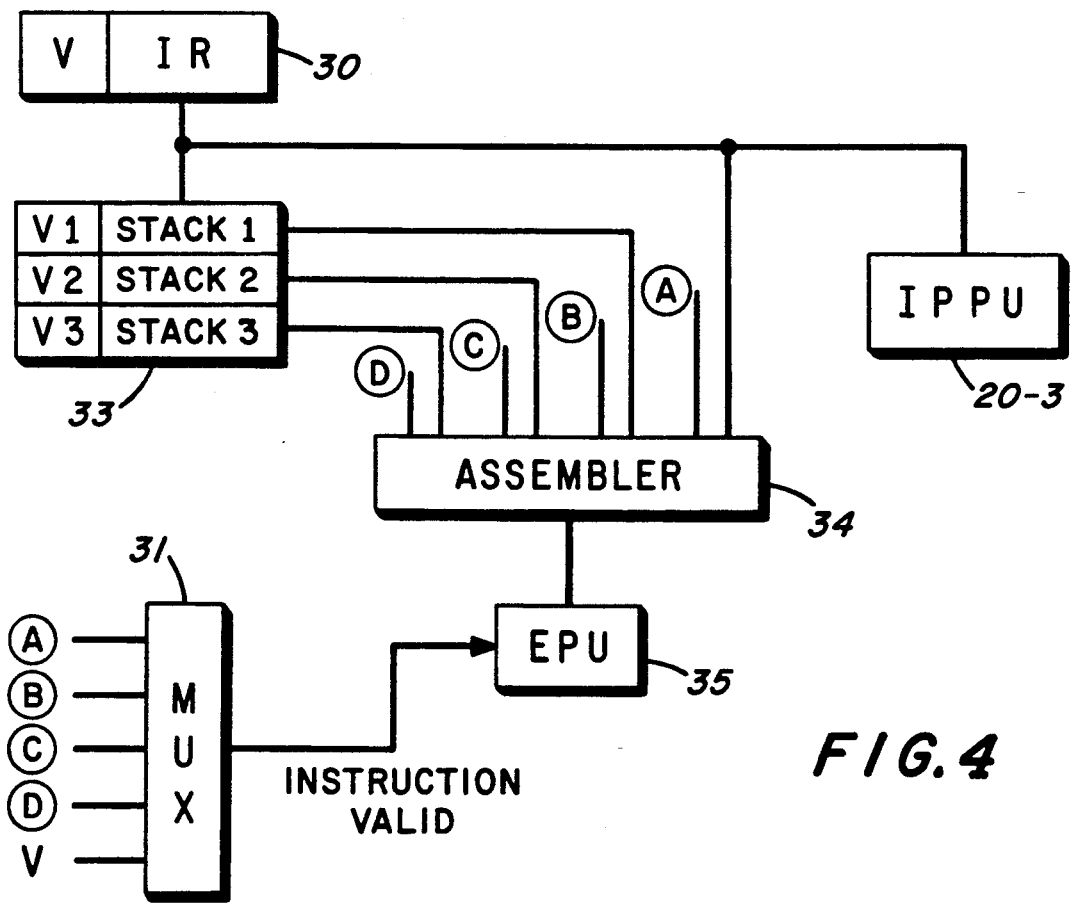
FIG. 4 illustrates a novel instruction stack in the EPU 20-4 of FIG. 4.

Referring to FIG. 4, an instruction stack (IS) for carrying out the present invention, disposed within the EPU 20-4 of FIG. 3, is illustrated.

In FIG. 4, the EPU 20-4 comprises an instruction stack (IS) IS 20-4A, the IS 20-4A including an instruction register (IR) 30 connected to the instruction bus for receiving an instruction from a sequence of instructions; an instruction queue 33 consisting of stack 1 and stack 2 connected to the IR 30; and a stack 3. An output is generated from stack 3, representing an instruction to be executed in the EPU 20-4. The instruction in stack 3 is normally the one being executed. However, a separate output is also gated from the IR 30, the stack 1, and the stack 2. Therefore, any one of the instructions in the IR 30, stack 1, or stack 2 may be executed instead of the instruction in stack 3.

Instructions are received in the EPU 20-4 directly from storage and are saved in the instruction stack IS 20-4A. The instruction stack includes an instruction register (IR) 30 to save (store) the instructions to be decoded and executed. Some instructions are not executable until the required storage data is available. Those instructions, which include the RX instruction type, are saved (stored) in the instruction queue (stack 1 and stack 2) until the operands and the execution logic are ready. The instruction queue 33 is used to match (or buffer) the instruction preprocessing speed with the speed of execution of the EPU. The IR 30 includes a valid bit V. The valid bit is set to 1 by the instruction bus indicating that a valid instruction is being presented to the IR 30. Each of stacks 1-3 of the instruction queue also include a valid bit V1, V2 and V3. The valid bits V1, V2, and V3 designate whether the instruction is one requiring execution by the EPU. In FIG. 4, note that a separate output appears from the IR 30, from the stack 1 and the stack 2 of the instruction stack, and from the stack 3 of the instruction stack, each separate output being connected to the ALU portion of the execution unit (EPU). As a result, the instruction disposed in the IR 30 may be executed directly; or the instruction in the stack 1 may be executed directly; or the instruction in the stack 2 may be executed directly; or the instruction in the stack 3 may be executed directly.

In FIG. 6, control latches are illustrated, for controlling the novel instruction stack of FIG. 4. Control latches C1 and C2 gate stack 2 and stack 1, respectively, to the assembler 34 when it is advantageous to execute stack 2 or stack 1. Similarly, gate 48 receives the valid bits V1, V2, V3 from stacks 1, 2, and 3 for gating the instruction register IR 30 when all valid bits V1, V2, and V3 are OFF (zero), indicating the stack is not needed as the instruction is executed directly from the instruction register IR 30.

A functional description of the novel instruction processing unit (IPU) of FIG. 3 of the present invention, including its execution processing unit (EPU) 20-4 and the novel instruction stack disposed therein, will be set forth in the following paragraphs with reference to FIGS. 3-6 of the drawings.

The IPU of this invention as shown in FIG. 3 is composed of an instruction preprocessing unit (IPPU) and an execution unit (EPU). The EPU is responsible for the execution of an instruction. The EPU 20-4 includes general purpose registers (GPRs), an arithmetic logic unit (ALU), a Rotate Merge Unit (RMU), and condition code logic. The instruction preprocessing unit is responsible for storage data operand requests, detection of conflicts and interlocks, and global pipeline controls.

An instruction processed and executed completely by hardware without any microcode is called a hardwired instruction. The typical pipeline structure used in the design of the IPU (or "processor") of the present invention for a hardwired instruction is composed of 7 sections:

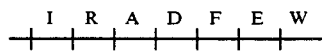

where
I is instruction fetch
R is opcode decode & read GPR/LS
A is storage address calculation
D is TLB & directory access
F is data cache accesses
E is execution
W is GPR/LS update In an ideal situation, each of these sections require one machine cycle to complete. However, not all hardwired instructions require all of the above operations. In fact, a different number of machine cycles are expended and a different pipeline sequence is utilized during execution of the various hardwired instructions. Therefore, to achieve the maximum "performance" for this processor, execution of a new hardwired instruction must be started every machine cycle (in sequential instruction processing mode). The term "performance" is synonymous with the term "throughput"; it is measured by recording the number of instructions-per-cycle, that is, the number of instructions completed in a machine cycle. This measurement is an average number produced when a batch of instructions or a program is processed in the processor; and is the inverse of the number of machine cycles it takes to complete a batch of instructions or a program; the smaller the number of machine cycles, the better the "performance" or "throughput".

In this application, a NOOP instruction is one which does not require any "active participation" from the EPU. The term "active participation" of the EPU involves participation by the EPU's adder, shifter and/or condition code logic. However, the act of receiving external data into an input register is not considered to be "active participation".

A pipelined processor is designed to allow processing to flow continuously and to minimize the processing time for each instruction. This is achievable if there is no interruption in the execution of the normal pipeline sequence of instructions. Storage data dependency is one of the two major interruptions to the pipeline approach. Time is required to request the data from the storage subsystem, to access the storage medium, and to return the data to the processor before processing can continue. The other interruption is caused by branches, which is not the topic of this application.

If all of the data dependencies are not resolved, an instruction cannot be executed. A subsequent instruction cannot proceed even if all the data operands for this instruction are available. One alternative for resolving this data dependency problem, termed the data-availability interlock design, involves waiting for storage data to be resolved before continuing execution. The above mentioned instruction queue 33 minimizes this storage access overhead for the duration of the same batch of instructions. The queue 33 allows instruction preprocessing to continue while the EPU is stopped and waiting for data operands. At the same time, the design maintains instruction execution in the same sequence as the instructions are originally dispatched. However, the "data resolution time" is an overhead time that must be paid for when first "filling" the pipeline.

The IPU of the present invention improves upon the aforementioned data availability interlock design by subtracting certain increments of time from the "data resolution time" (the waiting time during which operands are being sought from storage) thereby compressing the total execution time of the set of instructions executing in the execution unit of the IPU. This subtraction is accomplished by using the execution unit during periods of time when it is not normally being used. During the execution of the NOOP instruction, the execution unit of the IPU is not used, and NOOP instructions, are executed in the IPPU 20-3 of FIG. 3. The next instruction in the instruction stream sequence needs to use the execution unit, but must wait until execution of the previous NOOP instruction is complete. In accordance with the improved IPU of the present invention, the next instruction may now utilize the execution unit during the period of time when the IPPU is executing the previous NOOP instruction. Therefore, execution of the next instruction is completed one cycle earlier than previously anticipated. The execution time of the overall instruction stream is therefore "compressed".

There are several ways to shorten the total elapsed execution time of an instruction stream executing in the IPU:
1. cut the data retrieval time
2. overlap execution and data retrieval time
3. cut the execution time.

It is the objective of the improved IPU of the present invention to cut the execution time of a set of instructions executing in the execution unit of the IPU.

NOOP instructions, while executing, do not utilize a majority of the processor logic in the IPU. Therefore, if other subsequent instructions could use this processor logic during execution of the NOOP instruction, the total execution time of the instruction stream could be reduced. For example, a common group of instructions, known as NOOP instructions, involve no active execution phase and include the load, load half, and load address instructions. These instructions retrieve data from an external unit and update a specified register with the received data. The external unit may include a storage subsystem, the address processing logic, or any functional unit other than the EPU itself. The center of the EPU (the adder, the shifter, condition code logic, and other data manipulation logic) is not needed during the execution of each of these NOOP instructions. These instructions may be executed in the IPPU of the central processor shown in FIG. 3.

A typical trace program, one used to measure performance, comprises 17% load instructions, 5% load address instructions, and 2.5% load half instructions. Therefore, a total of 17+5+2.5=24.5% of the instructions in the trace program comprise NOOP instructions. Therefore, during 24.5% of the total execution time, when NOOP instructions are being executed, the EPU of the IPU is not being used. If this EPU idle time could be merged with the execution time of subsequent instructions, the execution of the subsequent instructions could be started a cycle sooner. This translates to a reduction of 1 machine cycle for every NOOP instruction in the program to be executed by the IPU (while the IPU is in so-called "stack" or "queue" mode).

Consider the following instruction sequence:
A R2, (LOC)
L R4, LOOPCNT
AR R5,R6

The first of these instructions being considered an RX instruction execution in the EPU; the second a NOOP instruction, and the third an RR instruction requiring less execution time than the RX instruction.

A timing chart for this instruction sequence, using an instruction stack of the prior art, is set forth below:

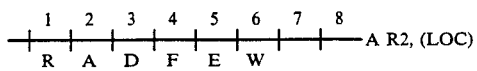

-continued

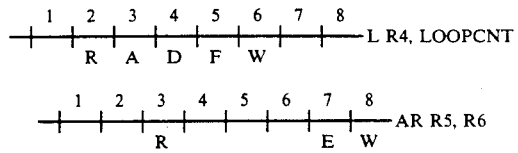

However, a timing chart for this instruction sequence, using the instruction stack of FIG. 4, in accordance with the present invention, is set forth below:

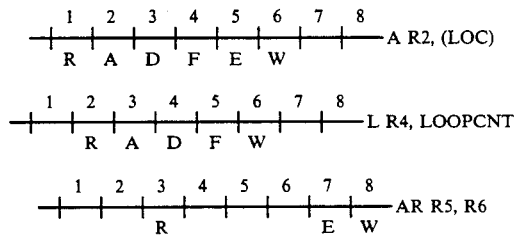

In the former timing chart, during machine cycle 6, the execution unit "E" is not being used (the IPU is executing a GPR/LS update, indicated by the acronym "W") and, during machine cycle 7, the execution unit "E" is being used to execute the instruction AR R5,R6. However, in the latter timing chart, during machine cycle 6, since the execution unit "E" is idle, the execution unit "E" is used to execute the subsequent instruction AR R5,R6 while, at the same time, the IPU is executing the previous instruction, the GPR/LS update, indicated by acronym "W".

In order to implement the function outlined above, a single input/multiple output (SIMO) instruction stack (instruction queue) is needed. In addition, control circuitry is also required to control the flow of instructions in the instruction queue.

In FIG. 4, a novel instruction stack 20-4A, disposed within the EPU 20-4 of the IPU 20, of the present invention, is illustrated. As noted above, the novel stack 20-4A includes an instruction register IR 30, an instruction queue 33 consisting of stack 1 and stack 2, and a stack 3 from which instructions are normally executed. Stack 3 has an output which represents the instructions which are normally executed from the instruction stack 20-4A. However, note that the IR 30 has its own separate output, stack 1 has its own separate output, and stack 2 has its own separate output. Therefore, an instruction in the IR 30, stack 1, or stack 2 may be executed instead of the instruction in stack 3. Each of the outputs represents instructions which are used to access general purpose registers (GPR) and to generate local control signals to guide the execution logic in the EPU and condition code generation.

The normal instruction stack 33 has a single input and a single output configuration (a new instruction enters the input, and the oldest instruction in the stack is executed from the output). Instructions are executed in the same order as they were received by the EPU. The SIMO IS of FIG. 4 is identical to the normal instruction stack referenced above, except that it has all levels available for output. Only one of these outputs is used by the EPU at a time.

RX type instructions, ones that require storage data as operands, are saved in the stack 33. RR type instructions, ones that do not require storage data as operands, can be completed sooner than the RX type instructions. However, when operating in "stack mode", in order to guarantee the correct execution order of the instructions, the RR type instructions that follow an RX instruction will also be saved in the stack and later be executed at the output of the stack. "Stack mode" is the state when the EPU executes the instructions from the enable of stack 3, via output signal D. When there are only invalid instructions in the stack of FIG. 4, and no RX instruction in instruction register 30, (stack 1, stack 2, stack 3) (i.e., only NOOP instructions) the EPU 20-4 switches from "stack mode" to "non-stack mode". When in "non-stack mode", instructions are executed from the instruction register (IR) of the IS 20-4A via enable signal A. There is a "variable stack mode". During "variable stack mode", RR type instructions are executed from the output of either stack 1, via enable signal B (when both stack 2 and 3 contain NOOPs), or from the output of stack 2, via enable signal C (when stack 3 contains a NOOP instruction).

The instruction register IR 30 contains a valid bit V which identifies the instructions from the bus as valid. Stack 1 contain valid bit V1, stack 2 contains valid bit V2, and stack 3 contains valid bit V3. The valid bits V1, V2, V3 are used to determine if the instruction in the associated register/stack is one which requires use of the execution unit (EPU). If the instruction is one which does not require use of the EPU (the instruction is a NOOP instruction), the valid bit, V1, V2, V3 is set off (0) by decoding logic 41, 46, 47 shown in FIG. 5. If the instruction does require use of the EPU (not a NOOP instruction), the valid bit V1, V2, V3 is set on (1) by this decoding logic. If the instruction received by the IS 20-4A is not a valid hardwired instruction as determined by the instruction bus, it is an invalid instruction and the valid bits V1, V2 or V3 associated with the invalid instruction is off (0). The valid bits are set or reset in accordance with the output of the control latches shown in FIG. 5. In non-stack mode, the value of valid bit V, in the instruction register IR 30 of the IS 20-4A, cannot propagate to V1, V2, or V3. During variable stack mode (defined more fully below), the value of the valid bit V of the instruction register can only propagate to the depth of the instruction queue (i.e., to V1, V2, or V3 depending on the control latches in FIG. 5) to identify valid non-NOOP instructions in each level of the stack.

In FIG. 6, the control logic utilized to govern the instruction flow in the instruction queue of the IS 204A of FIG. 4 is illustrated. The control logic comprises two control latches: control latch C1, and control latch C2. Each control latch controls a level of the stack in the instruction queue, i.e., control latch C1 in FIG. 6 gates stack 2 of the instruction queue 33 in FIG. 4, and control latch C2 gates stack 1 of the instruction queue 33. These control latches C1 and C2 are set and reset based on the history of instructions in the program and the current instruction status. The assembler 34 of FIG. 4 receives a plurality of inputs which can be either the instruction register 30 output or any of the stack levels 1, 2, or 3 from the instruction queue 33.

In normal operation the instruction queue 33 is not used until a first instruction in the instruction register 30 is decoded as being an RX instruction requiring the EPU to execute an arithmetic operation. The decoder 53 shown in FIG. 6 will detect with a respective control logic 41 in FIG. 5 the presence of an RX instruction. This will have the effect of setting the stack 1 V1 bit to a valid one. A latch 42 is set under this circumstance by ANDing the V bit from the latch 40 containing the V bit associated with the instruction register 30 with the decode RX.

Having thus decoded the presence of the first RX instruction, the V1 bit is set, the instruction enters the stack 33, and the full stack mode condition is entered. All instructions will then propagate through the stack until the RX instruction reaches stack level 3.

Each of the following instructions will be tested to determine whether it is a NOOP or non-NOOP instruction, i.e., an RX or RR instruction requiring execution by the EPU.

The first RX instruction will propagate down through the stack levels to stack 3 and in each case the appropriate valid bit V2, V3 will be set to 1 when the instruction reaches stacks 2 and 3 respectively.

AND gates 46 and 47 will test the instruction from the previous stack and when the previous stack instruction is propagated to V2 or V3, latches 43 and 44 will be set to be certain that they identify whether or not the instruction resident in stacks 2 or 3 are either NOOP or non-NOOP instructions.

Until the first RX instruction is detected, the instruction register 30 will be gated by a logic signal A, produced from FIG. 6 to the assembler 34. This non-stack mode will be utilized to execute each instruction, including RR instructions and further NOOP instructions loaded in the IR register 30. The stack mode will commence upon the first RX instruction decode by decode logic 53 and identified by latch 42.

Once the stack mode has been entered by detecting the presence of an RX instruction, the stack mode remains employed, wherein one of the stack levels 3, 2, or 1 is gated to the assembly 34 under control of an enable signals B, C, or D. Normally, after the first RX instruction is decoded, only instructions which are in stack 3 will be executed by the EPU processor 35 as part of EPU 20-4. Thus, the first RX instruction, having reached stack 3, will be executed by the detection of the valid bit V3 associated with this instruction in stack 3.

As further instructions propagate through the instruction queue comprising stacks 1, 2, and 3, the first time that a NOOP instruction reaches stack 3 wherein the EPU 35 is not needed for execution, its valid bit V3 will be set to 0. The next highest stack level, either stack 2 or stack 1, which contains the next RR instruction will be enabled by control logic circuitry shown in FIG. 6, providing that neither stack 1 or 2 and instruction register 30 contain an RX instruction as determined by the control logic circuitry of FIG. 6. The present embodiment control logic circuitry will maintain the stack in a full stack mode if an RX instruction is determined to be in any stack level or the instruction register 30. Output C will be enabled when the stack 2 instruction is a valid RR instruction, and stack 1 or the instruction register 30 does not contain an RX instruction. In the event that the instruction in stack 2 is also a NOOP instruction, as determined by bit V2, then output B will be enabled by the circuitry of FIG. 6 to permit stack 1 to be presented to the assembler 34 for execution by EPU 35 if stack 1 contains an RR instruction. Enable B is produced, of course, only if the V1 bit associated with the instruction in stack 1 is set to 1 indicating that a non-NOOP instruction requiring execution is present in stack 1 and that instruction is an RR instruction. If all of the stacks 1, 2, and 3 contain a NOOP instruction, the NOR gate 48 of FIG. 6 will generate the enable A indicating that output from the instruction register 30 is to be used for all subsequent executions, i.e., operating in the non-stack mode. This non-stack mode will continue until the next RX instruction is detected in the instruction register 30. Thus, non-NOOP as well as RR instructions can be continuously presented to the assembler 34 without use of the instruction queue 33 which is normally used to speed match the execution unit 35 with the instruction flow.

To complete the discussion with respect to FIG. 6, two control latches are shown, 49 and 50. These control latches are additionally connected to decoding circuitry 51 and 52. A decoder 53 is shown connected to the instruction register 30 for determining whether each instruction produced is an RX or not. In the event the instruction register 30 is decoded to have at any time an RX instruction, the instruction queue will remain in or change to stack mode until the RX instruction reaches level 3 and is executed. The logic circuitry 51, 52 of FIG. 6 will hold both of latches 49 and 50 reset keeping the system in full stack mode if another RX instruction is received in instruction register 30 before the RX instruction in level 3 is executed. In the event an RX instruction has been executed from stack level 3, and the next three consecutive instructions were not RX instructions, latches 49, and 50 may be set depending on the contents of stack levels 1, 2 or 3. If stack level 3 contains a NOOP instruction as determined by bit V3 and stack 2 contains a valid non-NOOP instruction as determined by bit V2, latch 49 will generate an enable C. If bits V3 and V2 are invalid, indicating stack levels 2 and 3 contain NOOP instructions, AND gate 54 will generate enable B if stack level 1 contains an RR instruction as determined by valid bit V1.

Obviously, if none of the stacks contain a valid bit, i.e., V1, V2, V3=0, NOR gate 48 will enable line A.

Thus, depending upon the instruction sequence in the stacks 1, 2, and 3, it is possible to operate the system in a full stack mode, partial stack mode, or no stack mode.

Returning again to FIG. 4, a MUX 36 is shown, which also provides an instruction valid indication to the EPU processor 35. This instruction valid is, of course, generated coincidentally with generating the enable signals A, B, C, and D for the assembler 34.

Throughout the discussion, it has been mentioned that the EPU need not execute a NOOP instruction. These NOOP instructions may, however, be executed by the IPPU 20-3 shown in FIGS. 3 and 4. However, the foregoing system, when operating in the stack mode, preserves the sequence between RX, RR, and NOOP instructions when RX and RR instructions are to be executed. By designing a single input, multiple output (SIMO) hardware instruction stack, we have combined the processor idle time with the execution of the subsequent instruction in stack mode. This apparatus compresses the time between valid executions of instruction N and instruction I, where N is any integer and I>=N+1. This stack can dynamically adjust the gap between 2 executed operations due to the variations introduced by different instruction sequences running in the processor at a time. This form of compression can only be performed effectively by hardware means due to the parallel decision process carried out by the control logic according to the instruction history of the program in execution. This apparatus allows the reduction of processor idle time in the EPU. Execution in sequence certainly limits the amount of complex design. Compression of idle time between valid operations enhances system performance. The combination of the two (execution in sequence and compression of idle time between valid operations) further enhances system performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having thus described our invention, what we claim as new and desire to secure by Letters Patent is:

1. A method of increasing the execution efficiency of a processor system which includes a first processor for executing NOOP instructions having no arithmetic segments and a second pipelined processor for executing arithmetic instruction segments contained in RX and RR instructions, comprising:
   supplying from an instruction register first, second and third consecutive instructions to a sequence of serially connected first, second and third consecutive instruction stack registers;
   decoding each instruction and placing a valid bit in a field associated with said instruction when said instruction is either an RR or RX instruction and an invalid bit when said instruction is a NOOP instruction;
   propagating each instruction including said valid or invalid bits to a next adjacent stack register, each machine cycle of said processors;
   executing each arithmetic segment of an instruction in said third stack in said second pipelined processor when said bit associated with said instruction is a valid bit; and
   executing a subsequent instruction arithmetic segment stored in another of said stack registers in said second pipelined processor when said bit associated with a NOOP instruction in said third stack register is invalid and said subsequent instruction is an RR instruction having a valid bit, whereby said second processor executes said subsequent instruction segment and said first processor executes a NOOP instruction in said third stack register.

2. A method of increasing the execution efficiency of a pipelined processor according to claim 1 further comprising:
   executing in said second processor an execution segment of an instruction subsequent to said subsequent instruction when said subsequent instruction is a second NOOP instruction.

3. The method of claim 1 wherein said instructions supplied by said instruction register are decoded, and feeding said first, second and third instructions in sequence to said second processor from said instruction register bypassing said stack registers when said first, second and third instructions are NOOP or RR instructions.

4. The method of claim 3 wherein any further instructions following said NOOP first, second and third NOOP instructions are decoded and routed to said first stack when an RX instruction occurs.

5. The method of claim 1 further comprising:
   routing a fifth instruction when the first instruction is decoded as an RX instruction received from said instruction register around said stacks to said second processor when said second instruction, third instruction and a fourth instruction are NOOP instructions.

6. The method of claim 1 further comprising:
determining whether said second or third stacks contain an RX instruction; and enabling execution of said later instruction only when said second or third stacks do not contain an RX instruction.

7. An apparatus for increasing execution efficiency of an arithmetic execution unit in a pipelined processor during execution of a sequential instruction stream which include NOOP instructions having no arithmetic execution segment and instructions having arithmetic execution segments comprising:
an instruction register for receiving each instruction to be processed in said pipelined processor;
each instruction being decoded by a decoding circuit connected to said instruction register for determining when a received instruction is a NOOP instruction and for setting a valid bit associated with said instruction identifying said instruction as a NOOP instruction or a non-NOOP instruction;
a plurality of serially connected multilayer stack registers forming multiple levels, each level having an individual output for supplying an instruction;
an instruction multiplexer connected to each output of said stack register for supplying a selected instruction to said arithmetic execution unit in response to a select signal;
control circuit connected to said instruction register and each level of said stack for determining the state of a valid bit associated with each instruction, said control circuit supplying said select signal to said multiplexer to apply an instruction from the highest of said stack levels to said execution unit when said highest level instruction is not a NOOP instruction, and supplying said select signal to said multiplexer to apply a lower level stack instruction to said execution processor when said highest level instruction is a NOOP instruction;
whereby said execution processor is provided with an executable task when a NOOP instruction is in said highest level stack.

8. The apparatus of claim 7 wherein said control circuit applies the next highest level stack instruction to said execution unit when said highest level stack instruction is a NOOP instruction.

9. The apparatus of claim 8 wherein said control circuit applies an instruction in a stack level below said next highest level when said stack next highest level and highest level contains a NOOP instruction.

10. The apparatus of claim 9 wherein said multiplexer has an additional input connected to said instruction register; and said control circuit includes means for enabling said multiplexer to apply said instruction register contents to said execution unit when three levels of said stack register contain NOOP instructions, bypassing said stack register.

11. The apparatus of claim 10 wherein said control circuit disables said multiplexer from supplying said instruction register contents directly to said execution unit when a subsequent instruction which is not a NOOP instruction occurs.

12. The apparatus of claim 7 wherein said control circuit determines whether an RX instruction has been received by said instruction register, and inhibits enabling of said multiplexer from applying said next highest level instruction to said execution processor.

13. An apparatus for increasing execution efficiency of an arithmetic execution unit in a pipelined processor during execution of a sequential instruction set which includes NOOP instructions having no arithmetic execution segments and non-NOOP instructions of first and second types RX, RX, having arithmetic execution segments comprising:
an instruction register for sequentially receiving each instruction of said set;
a single input multiple output stack register forming plural levels of instruction registers, said input being connected to receive each instruction from said instruction register and propagate said instructions through said stack register levels;
a decoder circuit connected to said instruction register providing a first decode signal when a first RX instruction is received, and a second decode signal when a next instruction following said first instruction is a NOOP instruction;
a first control latch which is set by said second decode signal;
a multiplexer having a first input connected to said instruction register and second, third, and fourth inputs connected to first, second, and third levels of said stack register, and an output connected to said execution unit, said multiplexer being enabled to transmit said third level when said RX instruction reaches said third level, and being enabled to transmit said second level when said next NOOP instruction reaches said third level and a subsequently following instruction reaches said second level, whereby said execution unit executes a non-NOOP instruction in said second level.

14. The apparatus of claim 13 further comprising:
a second control latch which is set when two consecutive instructions following said RX instruction are NOOP instructions, and which enables said multiplexer to transmit said first level to said execution unit when said two NOOP instructions have reached said second and third levels.

15. The apparatus of claim 14 further including:
a control circuit for enabling said multiplexer to transmit said instruction register contents to said execution unit when three consecutive NOOP instructions following said RX instruction have been stored in said first, second, and third register levels.

16. An apparatus for increasing the efficiency of an arithmetic execution unit in a pipelined processor during execution of a sequential instruction set including instructions of second and third types RX, RR having an arithmetic execution segment and NOOP instructions of a first type which do not require arithmetic execution comprising:
an instruction register connected to receive each instruction of said instruction set;
a single input, multiple output stack register having an input connected to said instruction register for propagating said each instruction from the lowest level through the highest level of said stack register;
a multiplexer having a plurality of inputs connected to said stack register multiple outputs and said instruction register for selecting one of said inputs for connection to said execution unit; and,
control circuitry means connected to decode each instruction in said instruction register and enabling said multiplexer to apply the highest level of said stack register to said execution unit when a first RX instruction is received in said instruction register and for assigning a valid bit to said RX instruction and to any subsequent instructions of second or third instruction types RX, RR, said control circuitry enabling the next consecutive stack register level which contains an instruction of said second or third instruction type when a NOOP instruction is received in said highest level of said stack register, whereby said execution unit does not remain idle when said NOOP instruction is in said highest stack level.

17. The apparatus of claim 16 wherein said multiplexer is enabled to pass an instruction from said instruction register to said execution unit when all of said stack levels contain a NOOP instruction, wherein said execution unit is continually connected to said instruction register until the next RX instruction is received.

18. The apparatus of claim 16 wherein said control circuitry enables said multiplexer to connect said instruction register to said execution unit prior to receiving said first RX instruction.

* * * * *

UNITED STATES PATENT AND TRADEMARK OFFICE
CERTIFICATE OF CORRECTION

PATENT NO. : 5,031,096
DATED : July 9, 1991
INVENTOR(S) : Buerkle et al It is certified that error appears in the above-identified patent and that said Letters Patent is hereby corrected as shown below:

On the title page, Item [75]       two additional inventors are omitted:

Daniel Joseph Buerkle
                       Newark Valley, New York

John David Jabusch
                       Endwell, New York

In column 7, line 10, after "queue" insert --33--.

on line 49, "IS 204A" should be --IS 20-4A--.

In column 14, claim 4, line 61, delete "NOOP".

In column 16, claim 13, line 6, change "RX, RX" to --RX, RY--.

Signed and Sealed this

Eleventh Day of May, 1993

*Attest:*

MICHAEL K. KIRK

*Attesting Officer*    *Acting Commissioner of Patents and Trademarks*